Dec. 26, 1967     W. E. STRUBE     3,359,583

POSITIONING APPARATUS

Filed Aug. 19, 1965     5 Sheets-Sheet 1

INVENTOR
W. E. STRUBE

BY *[signature]*

ATTORNEY

Dec. 26, 1967    W. E. STRUBE    3,359,583

POSITIONING APPARATUS

Filed Aug. 19, 1965    5 Sheets-Sheet 2

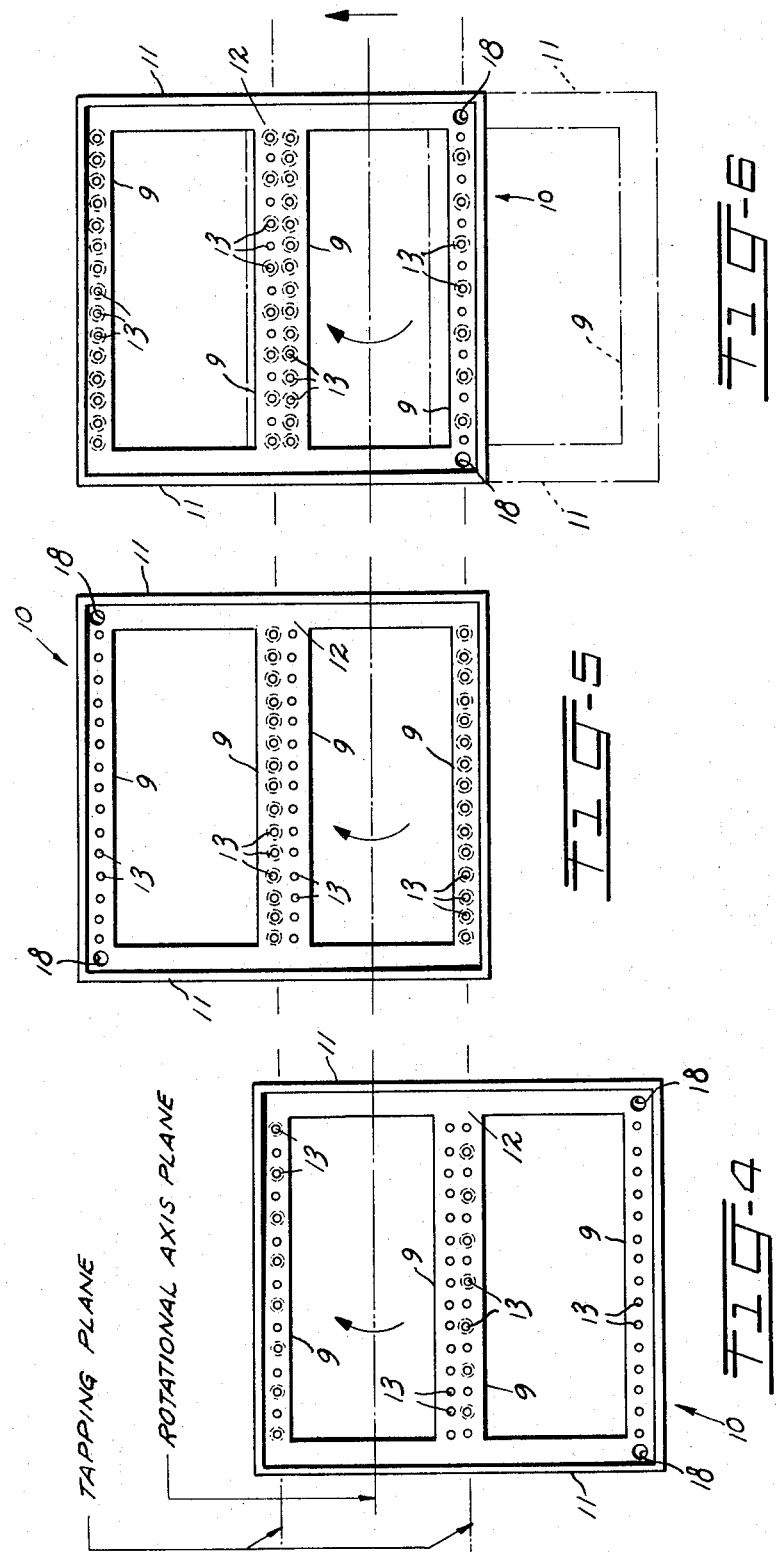

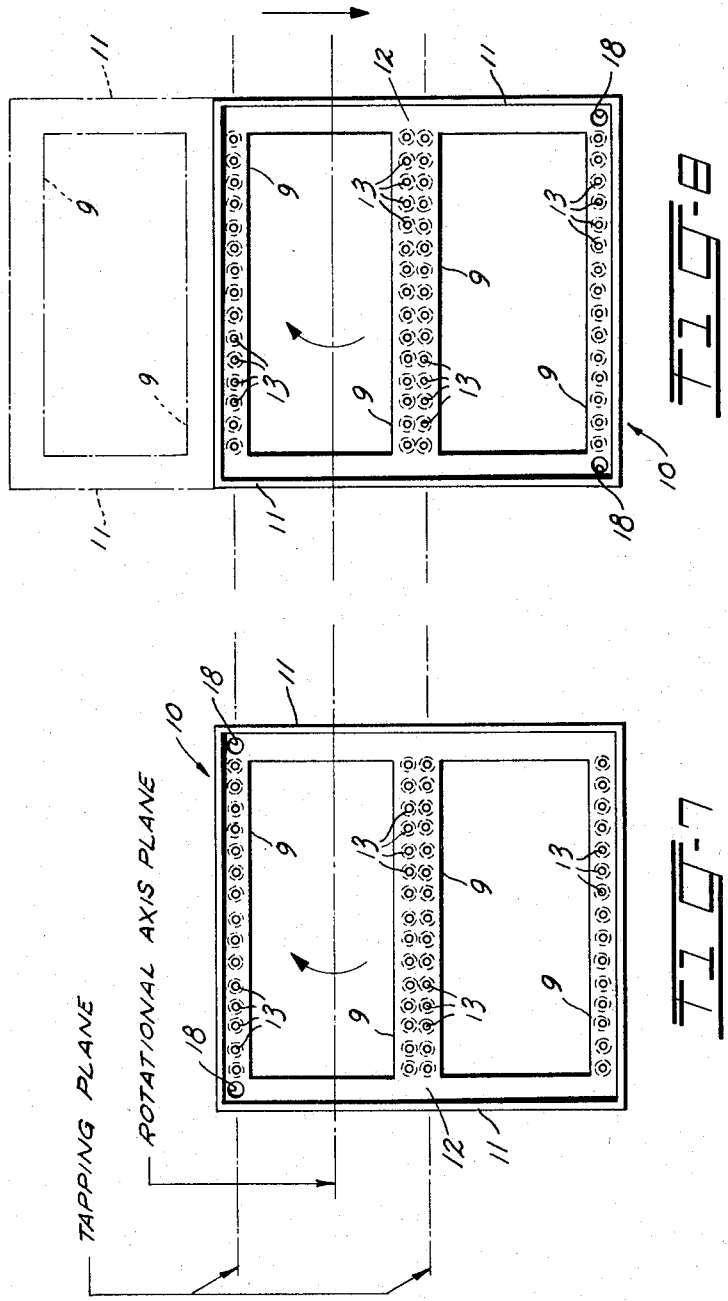

Dec. 26, 1967   W. E. STRUBE   3,359,583
POSITIONING APPARATUS
Filed Aug. 19, 1965   5 Sheets-Sheet 5

3,359,583
POSITIONING APPARATUS
Wilbur E. Strube, Maywood, N.J., assignor to Western
Electric Company, Incorporated, New York, N.Y., a
corporation of New York
Filed Aug. 19, 1965, Ser. No. 480,897
7 Claims. (Cl. 10—139)

ABSTRACT OF THE DISCLOSURE

An apparatus for positioning a frame having a plurality of closely spaced holes arranged in parallel rows beneath a plurality of tapping spindles. A movable indexing table, which includes a reciprocatable and rotatable carriage, automatically positions the frame with reference to the tapping spindles. Alternate holes are tapped in two rows, the frame is then rotated 180° and the alternate untapped holes are tapped in the same two rows. Thereafter, the frame is rotated 180° and shifted laterally and two additional rows are tapped in a similar manner.

---

This invention relates to a method of, and apparatus for, positioning articles and to a method of, and apparatus for, positioning frames with reference to a tapping apparatus.

In the tapping of frames having a plurality of holes such as apparatus mounting frames, considerable time is usually required to accurately position the frames with respect to a tapping apparatus. In a typical operation, a frame must be positioned beneath a multiple spindle tapping head so that each of the holes is located opposite a tapping spindle. The plurality of holes are then tapped simultaneously by the tapping head. If the number of holes is greater than the number of tapping spindles in a particular tapping head, or if the holes are located in a closer relationship than the spindle spacing, a number of separate tapping operations may be required. The operator, in such cases, must manually position the frame with respect to the spindles one or more times in order to tap all of the holes. Consequently, the manufacturing cost is increased because of the labor and time required to produce a finished frame.

An object of this invention is to provide an apparatus for automatically positioning a frame having a plurality of holes arranged in rows with respect to a tapping apparatus.

A more specific object of this invention is to provide an apparatus for rotating a nested frame with respect to a multiple spindle tapping head after a first tapping operation and then after a second tapping operation moving the frame laterally with respect to the head for a further series of tapping operations.

With the above and other objects and advantages in view, the present invention contemplates an apparatus for positioning a part with respect to a work station comprising nesting means to receive a part to be worked upon at the station, means for rotating the nesting means to position the part with respect to the work station, and means for moving the nesting means laterally with respect to the work station for positioning purposes. The invention also includes control means for actuating the means for rotating the nesting means and the means for moving the nesting means laterally in a predetermined sequence to position the part for a plurality of operations at the work station.

In one embodiment, the invention may be used to position a frame having a plurality of closely spaced holes beneath a multiple spindle tapping head. The positioning apparatus comprises a rotary index table having a reciprocatable carriage mounted thereon to receive the frame and a control system to regulate the movement of the index table and the carriage in order to automatically position the frame with respect to the tapping head during each cycle of operations.

To initiate the tapping operation, the frame is fed into a nest on the carriage. The tapping apparatus is actuated to move the index table with the carriage vertically into a tapping position where the taps engage the plurality of holes. The table is then lowered and the positioning apparatus rotated or indexed 180°. At the new position, the table is again raised and a second plurality of holes is tapped. Thus, the spacing limitations imposed by the spindle layout may be overcome since the new holes may be located immediately adjacent the originally tapped holes. On the downward movement of the table, the control system is activated to rotate the table 180° to its initial position and the carriage is moved along slide bars to position another group of holes of the frame for tapping. The cycle is then repeated.

Other objects and advantages of the present invention will become more apparent when considering the following drawings, wherein:

FIGS. 4–8 show a frame during various stages of the work cycle;

Figure 1:
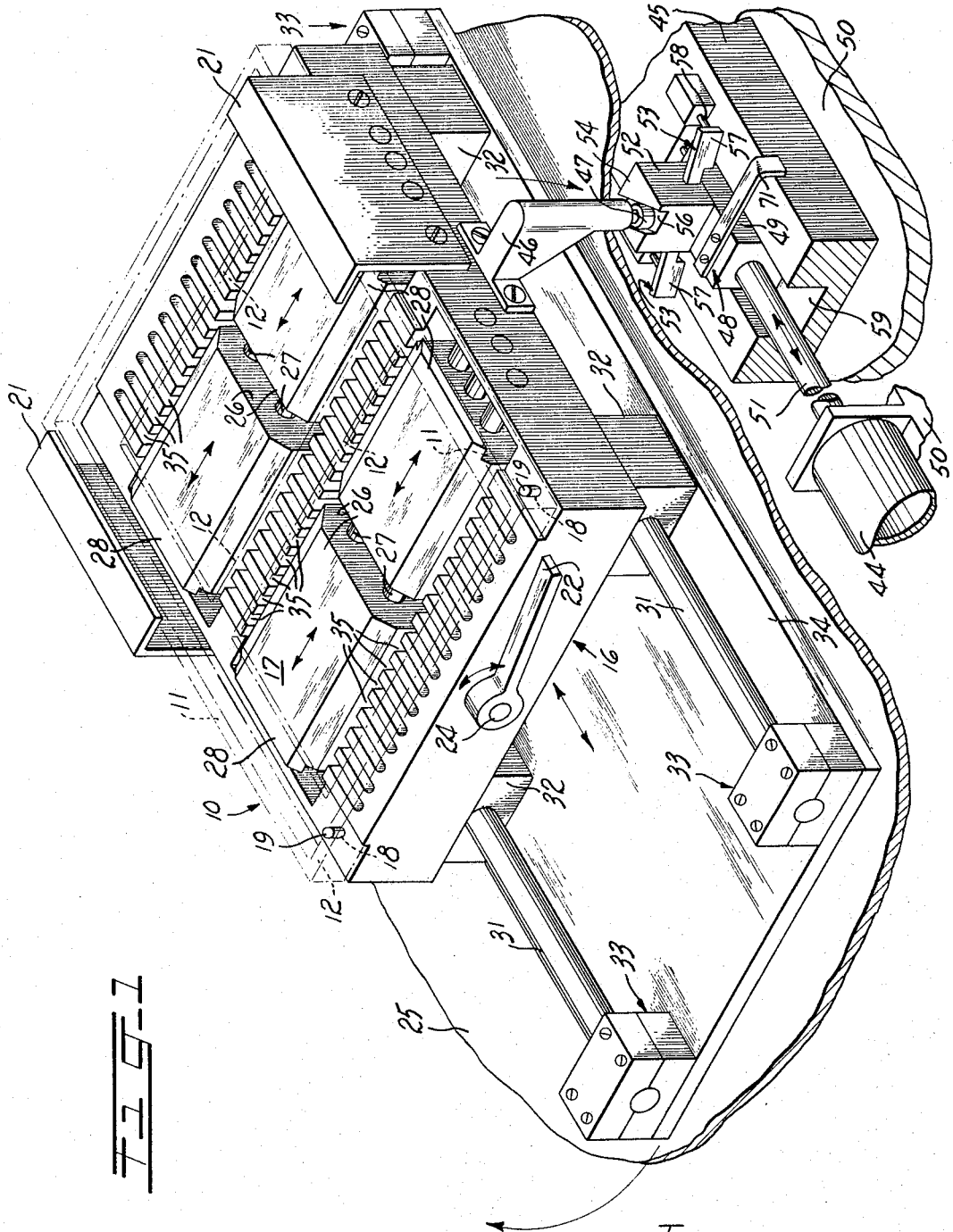
FIG. 1 is an isometric view of the invention with portions cutaway to illustrate the operation thereof.

Referring now to the drawings, the invention involves an apparatus for positioning a frame 10 of the type used for the mounting of electrical components with respect to a multi-spindle tapping head 15. The frame 10 includes side walls 11 and a base 12 having transverse portions 9 provided with a plurality of closely spaced holes 13 for the assembly of components thereto. In the illustrated embodiment, a frame 10 having fifteen holes 13 arranged in each of four parallel rows on the cross members 12 is positioned beneath the tapping head 15. The tapping spindles 20 and associated taps 30 are arranged in an offset relation in two parallel rows, the first row containing seven spindles and the second row containing eight spindles. The spindle spacing and the number of taps available in a conventional head limit the number of holes 13 which may be tapped at any one time and ordinarily necessitate several positioning operations. With the present invention, the frame 10 is moved automatically through a series of positions and the tapping head is operated after each position is reached. The invention is particularly useful where an odd number of holes arranged in rows are to be tapped since there may be an even number of tapping spindles in one row and an odd number of tapping spindles in another row.

Figure 9:
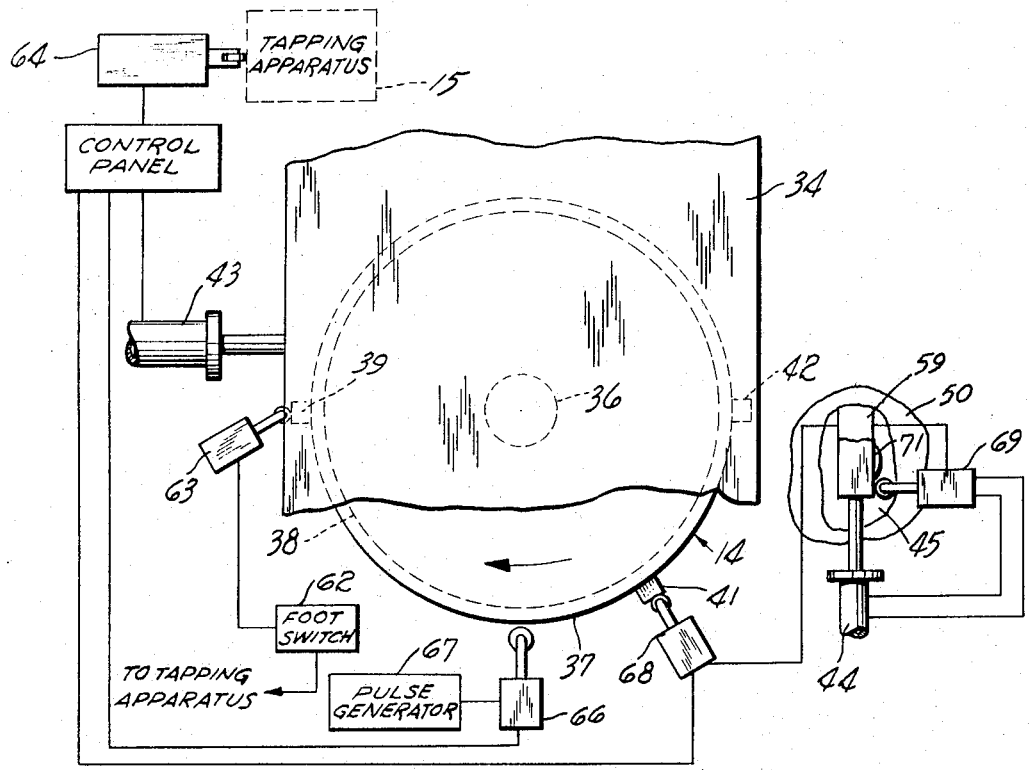
FIG. 9 is a schematic drawing of the control system for the invention.

The positioning apparatus of the present invention comprises a rotary indexing table 14 having a reciprocable carriage 16 mounted thereon and a control system, shown in FIG. 9 for regulating the movement of the indexing table 14 and the carriage 16 in order to automatically position the frame 10 with respect to the tapping head 15. Thus, it is possible to feed a frame 10 onto the carriage 16 and then regulate the position of the frame 10 during a series of tapping operations without removing and replacing the frame 10. The positioning apparatus, therefore, minimizes the dependence upon spindle spacing and tap arrangements and provides added flexibility for existing tapping apparatus.

Briefly, the tapping operation is performed in the following sequence on the frame 10: Alternate holes 13 in two parallel rows on the nested frame 10 are tapped, the frame is rotated 180° by means of the index table 14 and the untapped holes 13 of the two rows are tapped. The frame 10 is then moved by the reciprocable carriage 16 in a direction normal to the rows and the holes in two other parallel rows are tapped in a similar manner. FIGS. 4–8 show the progress of the frame 10 at various stages of the tapping operation.

Figure 2:
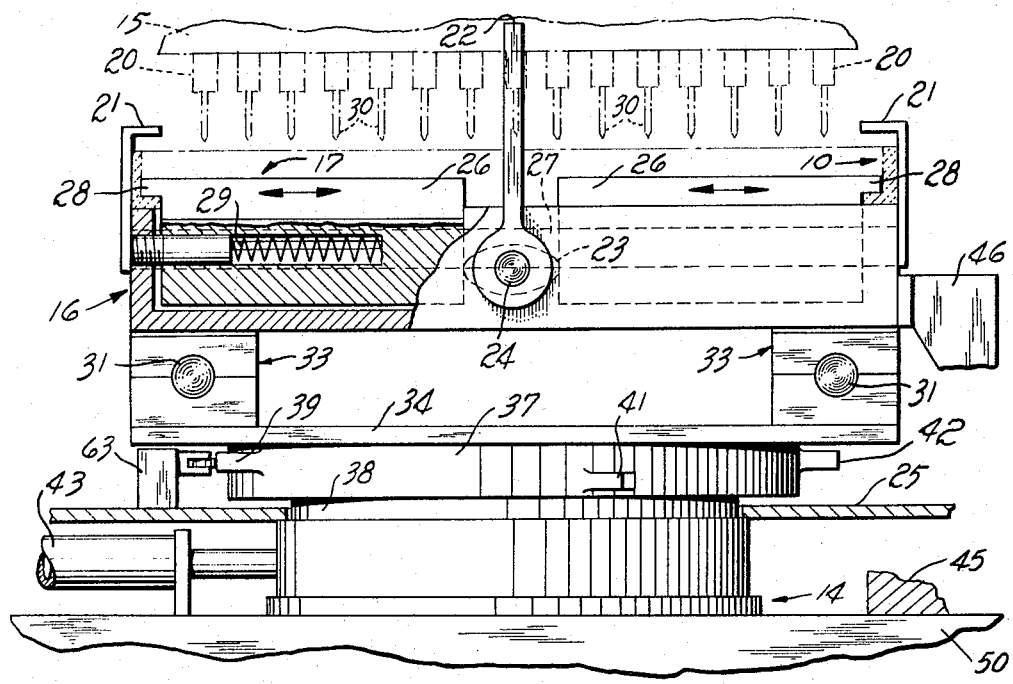
FIG. 2 is an end view of the invention with portions cutaway for purposes of illustration.

As shown in phantom in FIG. 1, a frame 10 is fed into a nest 17 located on the carriage 16. The frame 10 is positioned with the apertures 18 engaging locating pins 19 and with the side walls 11 located adjacent the guards 21. The guards 21 facilitate locating the frame 10 and prevent possible damage to the taps during the frame feeding operation. The nested frame 10 is locked in place by turning the lever 22 into an upright position causing rotation of cams 23 which are mounted on shaft 24, see FIGS. 1 and 2. The cams 23 drive the locking elements 26 along guide bars 27 to place the overhanging portions 28 securely against the frame 10. When the frame 10 is to be released, the lever 22 is turned from a vertical locking position permitting the locking elements 26 to return to their original position under the urging of springs 29. The nest 17 also includes a plurality of slots 35 which are located beneath the tranverse portions 9 of the frame 10 in order to permit through hole tapping and facilitate chip removal.

The carriage 16 is slidably mounted on bars 31 which extend through mountings 32 attached to the carriage and are supported in housings 33 at each end. The housings 33 are fixedly connected to a platform 34 which is suitably mounted on the indexing table 14. The indexing table 14 includes a cam carrying portion 37 and a lower reduced portion 38. Cams 39, 41 and 42 are mounted on the cam carrying portion 37 above oil tray 25 to provide signals to the control system which regulates the movement of the positioning apparatus.

The movements of the table 14 and the carriage 16 are governed by the air cylinders 43 and 44, respectively. The indexing cylinder 43 drives the table 14 through a conventional ratchet-type coupling (not shown) which transmits the motion of the cylinder 43 to the indexing table 14. The cylinder 44 mounted on base 50 drives the carriage 16 back and forth on bars 31 through the coupling formed by the overhanging bracket 46, roller 47 and the piston rod connection 48.

Figure 10:
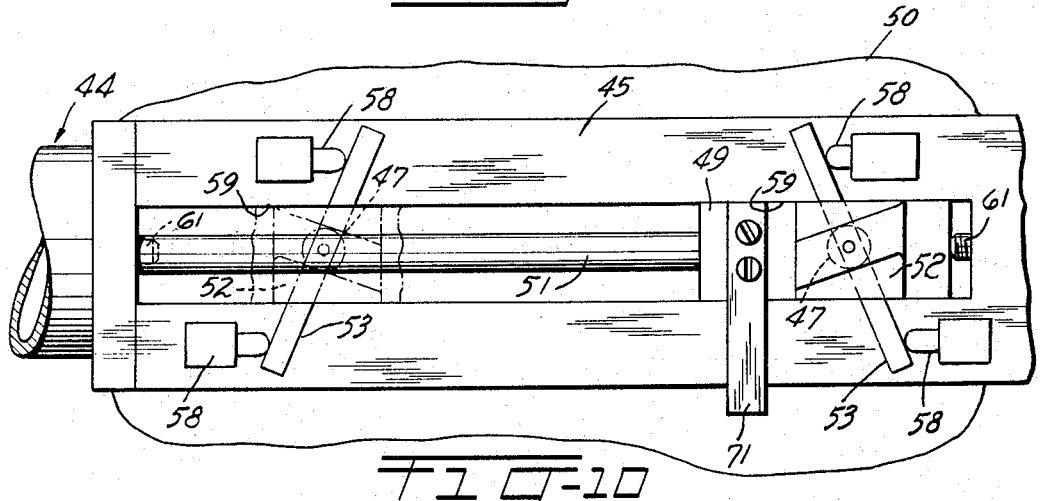
FIG. 10 shows the driving means for the carriage in greater detail with the stop arrangement shown in phantom.

As shown in FIGS. 1 and 10, the piston rod connection 48 comprises a lower portion 49 mounted to the rod 51 and a pivotally mounted upper block portion 52 having a pair of arms 53 extending therefrom and an upper surface 54 having a slot 56 running radially thereacross. Each arm 53 has a downwardly extending portion 57 which contacts a stop 58 when the piston rod 51 reaches the end of its travel. The sets of stops 58 are positioned to cause the arms 53 to pivot shifting the block portion 52 and its radial slot 56 to proper orientation. Such orientation is necessary to permit roller 47 to move through a slot 56, regardless of which lateral position the carriage 16 is in during its rotation. Thus, when the cylinder 44 drives the lower portion 49 of the piston rod connection 48 back and forth along the guideway 59 in block 45, the carriage 16 is similarly reciprocated through the coupling formed by the bracket 46 and roller 47. Stops 61 are designed merely to limit the travel of the lower portion 49.

Figure 3:
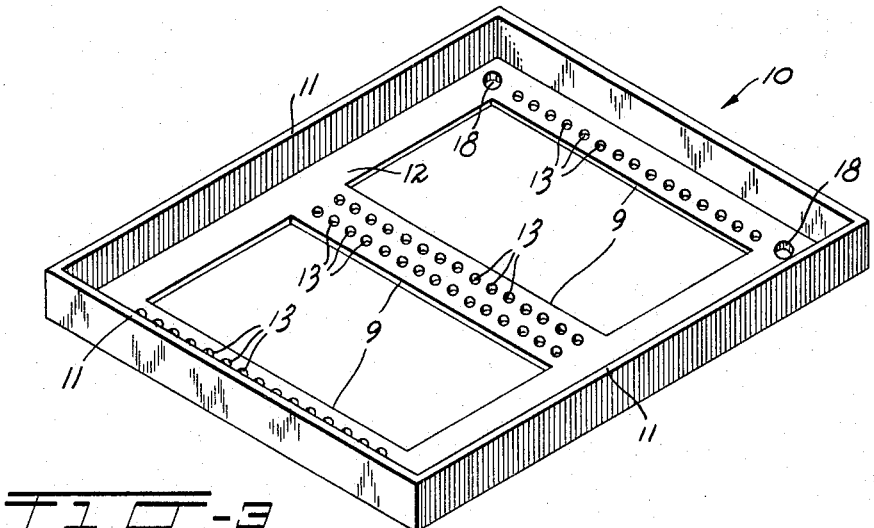
FIG. 3 shows a typical frame which is positioned by the invention.

In operation, a frame 10 having a plurality of holes 13 arranged in a number of spaced rows on transverse cross members 12, see FIG. 3, is fed into the nest 17 on the carriage 16. Switch 62 is tripped to actuate the tapping apparatus 15 and cause the table 14 and carriage 16 to rise so that the taps 30 engage the holes 13. Switch 63 is connected in series with switch 62 to prevent operation of the tapping apparatus if the table 14 is not properly positioned. The cam 39 must be in position to engage the switch 63 to permit the tapping apparatus to function. When both switches 62 and 63 are closed, the apparatus will tap two rows of holes as shown in FIG. 4. While the invention is described with reference to a tapping head 15, it could also be used in conjunction with a drilling or other apparatus.

After the initial tapping operation, the apparatus table descends tripping one-way switch 64 and sending an electrical signal to the indexing cylinder 43. The cylinder 43 operates driving the table 14 through an arc of 90°. As the table 14 rotates, cam 42 closes switch 66 permitting pulse generating means 67 to feed a single pulse to the indexing cylinder 43. The cylinder drives the table another 90° for a total rotation of 180° to position frame 10 as shown in FIG. 5.

The tapping head 15 is actuated once again through switches 62 and 63 causing the table 14 to rise for another tapping operation. The holes 13 in the frame 10 intermediate the previously tapped holes are then tapped as shown in FIG. 5. The descending apparatus table closes switch 64 to initiate another cycle of rotation as described above. As the table rotates the frame 10 to the dotted line position appearing in FIG. 6, cam 41 which is mounted on table 37 in a different plane than cams 39 and 42 trips switch 68 sending a signal through the directional switch 69 to the cylinder 44. The cylinder 44 drives the carriage 16 along the rods 31 in a direction indicated by the position of arm 71 which operates the switch 69, to move the frame to the full line position in FIG. 6. The frame 10 is thus positioned for tapping third and fourth rows of holes as shown in FIGS. 6 and 7. The tapping is performed in a series of steps similar to that previously described with reference to the first and second rows of holes 13. On the completion of the last tapping operation, the frame 10 is rotated 180°, as shown in dotted lines in FIG. 8 and is then shifted to its original position and removed from the nest 17, another frame 10 is then fed into the nest 17. The positioning apparatus, therefore, accurately and efficiently positions a frame 10 for a series of tapping operations. The operation may readily be performed in a completely automatic fashion by providing feeding means and means for ejecting the tapped frame 10 from the nest 17.

It is to be understood that the above-described arrangements are simple illustrative examples of the application of the principles of the invention. Numerous other arrangements may be readily devised by those skilled in the art, which will embody the principles of the invention and fall within the spirit and scope thereof.

What is claimed is:
1. The method of positioning a frame having a plurality of parallel rows of holes with respect to a tapping apparatus comprising:
feeding a frame into the nest of a tapping apparatus to tap alternate holes of a first plurality of holes arranged in at least one row,
rotating the frame 180° to position the holes intermediate the originally tapped holes with respect to the tapping apparatus,
rotating the frame 180° to its initial rotary position after the intermediate holes are tapped,
moving the nested frame laterally with respect to the tapping apparatus to position a second plurality of holes arranged in at least one row for tapping, and
rotating the frame 180° to position the holes intermediate the second plurality of tapped holes for a tapping operation.

2. The method of positioning a frame according to claim 1 comprising:
rotating the frame 180° and moving the frame laterally in a direction opposite to the direction of the preceding lateral movement to return the frame to its original position.

3. The method according to claim 1 wherein: the frame includes two rows of intermediately located holes and a row of holes spaced from the two rows at each side of the frame comprising:
feeding the frame into the nest to tap alternate holes in one of the intermediate rows of holes and one of the rows at one side of the frame, and
moving the nested frame laterally to position the alternate holes in the other of the intermediate rows and the other row at the opposite side of the frame for tapping.

4. The method according to claim 1 comprising:
raising the frame to enable the holes to be tapped as each tapping position is reached, and
lowering the frame after the holes are tapped.

5. An apparatus for positioning a part with respect to a work station comprising:
a carriage having means for locating a part thereon and means for locking a part in position including:
at least one pair of slidable locking members mounted in opposing relationship,
resilient means urging the locking members towards one another, and
a cam mounted intermediate the members and actuable to move the members apart and against the opposite ends of the part to lock the part in position,
means for rotating the carriage through a predetermined angle to position the part with respect to the work station,
means for moving the carriage laterally, and
control means for actuating the rotating means and means for moving the carriage laterally in a predetermined sequence to position the part for a plurality of successive operations at the work station.

6. An apparatus for positioning a part with respect to a work station comprising:
means to receive a part to be worked upon at the station,
means for rotating the receiving means through a predetermined angle to position the part with respect to the work station,
means for moving the receiving means laterally with respect to the work station comprising:
a drive cylinder having a slotted connecting member mounted thereto, said cylinder being actuable to move the receiving means back and forth, and
a roller mounted on the receiving means for engaging the slot in the connecting member for reciprocable movement, said roller being disengaged from the slot during the rotational movement of the receiving means,
control means for actuating the means for rotating the receiving means and the means for moving the receiving means laterally in a predetermined sequence to position the part for a plurality of operations at the work station.

7. An apparatus for positioning a frame having a plurality of holes with respect to a tapping apparatus comprising:
a rotatably mounted index table,
drive means connected to the table to cause predetermined increments of rotation upon actuation thereof,
a movable carriage mounted on the index table, said carriage including:
a nest to receive a frame thereon,
a plurality of slots located in the nest beneath the holes in the frame to accommodate the tapping apparatus,
at least one pair of opposed spring-loaded members mounted in the nest, each having a protruding portion extending over the frame and lock the frame within the nest,
a rotatable shaft extending perpendicularly to the spring-loaded members, and
a cam mounted on the shaft intermediate each pair of opposed members to force the members in opposite directions against the frame upon rotation of the shaft,
connecting means extending from the carriage for engagement when the carriage is moved along the index table to position a nested frame with respect to the tapping apparatus,
drive means intermittently engaging the connecting means on the carriage to move the carriage back and forth,
switching means actuating the drive means for the table to rotate the table 180° to position a frame with reference to a tapping apparatus after a first tapping operation thereon, and
switching means actuating the drive means for the carriage to move the carriage laterally with respect to the tapping apparatus after at least one tapping operation to position the frame for further tapping operations.

References Cited

UNITED STATES PATENTS 2,939,367    6/1960    Thomas _____ 77—63.1

FRANCIS S. HUSAR, *Primary Examiner.*